United States Patent [19]

Strittmatter et al.

[11] 4,366,615
[45] Jan. 4, 1983

[54] METHOD OF MAKING AN EXTERNAL ROTOR GYROSCOPE

[75] Inventors: Bernhard Strittmatter, Nussdorf; Wolfgang Syré, Friedrichshafen, both of Fed. Rep. of Germany

[73] Assignee: Bodenseewerk Geraetetechnik GmbH, Uberlingen, Fed. Rep. of Germany

[21] Appl. No.: 173,144

[22] Filed: Jul. 28, 1980

Related U.S. Application Data

[60] Division of Ser. No. 6,381, Jan. 25, 1979, Pat. No. 4,283,959, which is a continuation of Ser. No. 803,752, Jun. 6, 1977, abandoned.

[30] Foreign Application Priority Data

Oct. 14, 1976 [DE] Fed. Rep. of Germany ....... 2646376

[51] Int. Cl.³ .......................................... H02K 15/02
[52] U.S. Cl. ......................................... 29/598; 74/5.7
[58] Field of Search ................. 29/598, 596, 447; 74/5.7, 5 R; 310/42, 261

[56] References Cited

U.S. PATENT DOCUMENTS

| 2,771,778 | 11/1956 | Ryberg | 74/5 F |
| 3,446,081 | 5/1969 | Oger | 74/5.7 |

*Primary Examiner*—Carl E. Hall
*Attorney, Agent, or Firm*—Howard H. Darbo

[57] ABSTRACT

An external rotor comprises an annular case within which is the laminated stack forming the motor drive members and end members at each side of the stack. These are heat fitted together to form an annular blank which is then machined to form an axial bore therein and end faces normal to the bore. A stator laminated stack is heat fitted onto an axle and thereafter peripherally machined and bearing seats are machined on the ends of the axle. After the stator is inserted into the rotor bore, bearings are mounted on the ends of the axle and preloaded by tightening nuts onto the axle ends and against the bearings. The bearings comprise inner rings seated directly on the axle and outer rings seated directly on the inside and end faces of the rotor.

1 Claim, 1 Drawing Figure

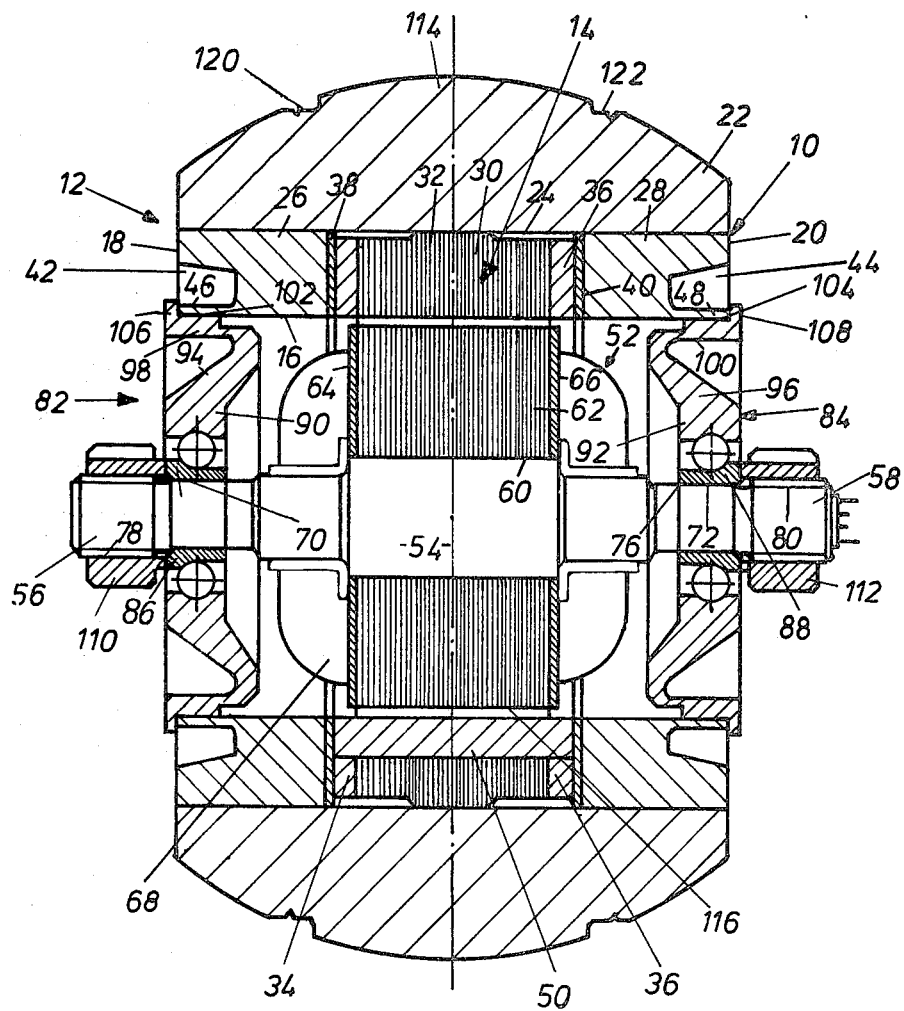

METHOD OF MAKING AN EXTERNAL ROTOR GYROSCOPE

RELATED APPLICATION

This is a division of application Ser. No. 006,381, filed Jan. 25, 1979 now U.S. Pat. No. 4,283,959 which is a continuation of application Ser. No. 803,752, filed June 6, 1977, now abandoned.

BACKGROUND AND SUMMARY OF THE INVENTION

The invention relates to a gyroscope having a sleeve-shaped gyro rotor and a stator located inside the gyro rotor, in which the gyro rotor is mounted on both sides of the stator through ball bearings on an axle rigidly affixed to the stator.

Such gyroscopes serve as attitude reference instruments and are used for stabilization and navigation purposes. With a gyro in the form of a synchronous motor the stator comprises a rotor laminated stack with squirrel cage rods and squirrel cage rings. With a gyro in the form of a synchronous motor a hysteresis ring is provided correspondingly. Such gyroscopes must be manufactured with high precision, in order to avoid, for example, a drift, i.e., a slow deviation of the gyro spin axis from its original position.

With prior art gyroscopes of the type mentioned hereinbefore the rotor is composed of a plurality of parts. Usually the rotor comprises a rotor ring acting as a gyrowheel. This ring is conventionally composed of two halves. The inner surface of the rotor ring supports the rotor laminated stack. This rotor ring is mounted on the axle of the stator through bearing plates and a separate ball bearing mounted in the bearing plate. Generally the individual parts are made of different materials. With such a construction the manufacturing tolerances will add up. In addition, the dimension may vary due to different thermal dilation of the parts.

In other prior art gyroscopes (U.S. Pat. No. 3,248,952) the gyro rotor is not mounted directly on the axle of the stator but independently thereof in the gyro housing. With such a design, additional tolerances with regard to the alignment of the gyro rotor and the stator will result.

Furthermore, a gyro is known in which the rotor lamination is set into a sleeve-shaped rotor ring which has a straight cylindrical through bore. The rotor is mounted on both sides on two aligned pins provided on a frame or, through ball bearings and bearing plates. The stator of the gyro is supported between the two pins through resilient metal diaphragms. Also with this prior art design there will be considerable problems of manufacturing technique, for example, due to the fact that the two pins separately attached to the frame have to be in exact alignment with each other.

It is the object of the invention to provide a gyroscope of the type defined in the beginning which can be manufactured with high precision with conventional manufacturing processes, in which the cumulative number of tolerances involved can be kept small and which permits easy assembly of the gyroscope.

In accordance with the invention, this object is achieved in that the gyro rotor forms a substantially solid annular part comprising a rotor ring and a motor drive member and has a cylindrical through bore and plane end faces normal to the axis of this through bore and that the ball bearings, having their inner rings seated on the axle of the stator, fit with a cylindrical peripheral surface directly into the through bore and are trued by radial flanges relative to the respective end faces.

In the design of the invention the gyro rotor behaves substantially like a solid part which may be manufactured with correspondingly high precision. This part has a straight cylindrical through bore. The plane end faces of the rotor are machined in accordance with this through bore. The ball bearing seats on the axle of the stator and the circumferential surface of the stator laminated stack can be machined in similarly precise manner. Then the ball bearing, manufactured with high precision, ensures the exactly aligned arrangement of the gyro rotor relative to the stator. There are substantially only four parts, namely, the stator, the rotor and the two ball bearings whereby the number of tolerances which can add up is at a minimum. In order to disassemble the gyro thus constructed, it is only necessary to pull the ball bearings axially off the axle of the stator. Then the stator can be pulled out of the straight, cylindrical through bore without any disassembly of the gyro rotor. The assembly can be effected in the same way, the mutual re-alignment of the parts being ensured.

A method for manufacturing a gyro constructed in accordance with the invention is characterized in that the inner parts of the gyro rotor are manufactured with a machining allowance and are shrink fitted into a cylindrical annular case member to form a solid blank, that subsequently the through bore of this blank is machined accurately to a size appropriate for the accommodation of the stator with allowance for the air gap as well as for the accommodation of the outer ring of the ball bearing, that subsequently the end faces of the gyro rotor are machined accurately in a machining procedure orienting itself by use of the machined through bore, that a stator laminated stack is heat fitted on the axle of the stator and ball bearing seats are machined with high accuracy on the axle on both sides of the stator laminated stack, and that, after the stator has been inserted into the through bore, the ball bearings are put onto the axle from both sides with their inner rings on the ball bearing seats and the bearings are set into the through bore of the gyro rotor with the cylindrical circumferential surfaces of the outer rings of the bearings seated upon the rotor, and the bearings eventually are preloaded by screwing screw-down nuts onto the axle of the stator.

DESCRIPTION OF THE DRAWING

The drawing is an axial cross-section of a gyroscope embodying the invention.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

In the illustrated embodiment the gyro rotor, generally 10, comprises a jacket shaped rotor ring, generally 12, and a motor drive member, generally 14. Rotor ring and motor drive member form a substantially solid annular part, which has a cylindrical through bore 16 and plane end faces 18 and 20 extending normal to the axis of this through bore 16. In detail the rotor ring comprises an annular jacket or case member 22, extending over the whole length of the rotor and having a straight cylindrical through bore 24, and two end members 26 and 28. The motor drive member 14 is in the middle of bore 24 and annular end members 26 and 28 are on both sides thereof. The three are securely mounted in the case member 12. The axially outer end faces of the end members 26 and 28 lie in the same plane as the end faces of the case member 22 and form the plane end faces 18 and 20 of the gyro rotor 10. The inner diameters of the drive member 14 and of the end members 26 and 28 are equal and thus define the cylindrical through bore or opening 16 of the gyro rotor 10.

The motor drive member 14 of the gyro rotor 10 comprises an annular, laminated stack 30 the outer surface of which has a smaller diameter, near its ends, than the through bore 24 of the case member 22. It is held in the through bore 24 only through a central portion 32 projecting radially beyond the end portions. The drive member comprises squirrel cage rings 34 and 36 on both sides of the laminated stack 30. The gaps 38 and 40, respectively, defined between the drive member 14 and the end members 26 and 28, respectively, are filled up with resilient plastics, whereby a thermal dilation of the motor drive member 14 becomes possible in the axial direction while, on the other hand, clogging of machining chippings, such as cutting or grinding dust, is prevented. Annular grooves 42 and 44 are provided in the plane end faces 18, 20, respectively, of the gyro rotor 10. These are positioned at a small distance from the through bore 16. Thereby resilient or elastically flexible rim portions 46 and 48 are formed in the gyro rotor 10.

The stator 52 of the gyroscope has an axle 54 extending therethrough. Ends 56 and 58, respectively, of the axle project on opposite sides of the stator. A laminated stator stack 62 is supported on a central, larger diameter, portion 60 of the axle 54. Numerals 64 and 66 designate conventional isolating washers. Numeral 68 designates the stator winding. Ball bearing seats 70 and 72 are formed on the ends of the axle 54 of the stator 52. Outward of the ball bearing seats 70 and 72 the axle is threaded at 78 and 80, respectively.

Ball bearings or ball bearing assemblies, generally 82 and 84, are provided on both sides of the stator 52 to mount rotor 10 thereon. The inner rings 86 and 88, respectively, of the ball bearings 82 and 84 are seated on the ball bearing seats 70 and 72 of the stator shaft. The outer rings 90 and 92, respectively, of the ball bearings each have a frustoconical flange 94 or 96, respectively, extending axially inwards and radially outward toward the wall defining bore 16, while at the same time becoming thinner, a peripheral ring 98 or 100, respectively, and a radial flange 106 or 108, respectively. The peripheral rings 98 and 100 have cylindrical circumferential surfaces 102 or 104, respectively. Radial flanges 106 and 108 are positioned at the outer end of each ring 98 and 100, respectively. The portions 90, 94, 98 and 106 are integral, as are portions 92, 96, 100 and 108. The radial flanges 106 and 108 partially overlap the annular grooves 42 and 44, respectively. The presence of the annular grooves 42, 44 permit a tool to grip the rear of radial flanges 106, 108 and pull the ball bearings off for the disassembly of the gyroscope. The inner rings 86 and 88 of the ball bearings 82 and 84, respectively, are held in place by nuts 110 and 112, respectively, threaded onto the ends 56, 58 of the axle of the stator 52. The ball bearings are preloaded by the inward pressure exerted by the nuts against the inner rings and the outer portions abutting, at 106 and 108, the end faces 18 and 20, respectively, of the gyro rotor 10. The radial flanges 106 and 108, the ball bearings 82 and 84, respectively, cause the bearings to be trued relative to a respective one of the end faces 18 and 20, respectively.

In the manufacturing of the gyroscope described the inner parts 26, 30, 28 of the gyro rotor 10 are produced with an external diameter greater than the internal diameter of the annular case member 22. Then the inner parts are securely affixed within the annular case member 22 by thermally changing the radial dimensions of the parts as they are fitted together to form a blank. Also the inner parts are initially formed with an internal machining allowance and the case member 22 is similarly provided with an external machining allowance. Preferably, the radial dimensions are thermally changed by heating the case member 22 to about one hundred degrees centigrade and by cooling the inner parts in liquid nitrogen. Thereby the inner parts are shrunk and the case is expanded to permit the former to be inserted into the latter, and an indecomposable connection between the two is established after equalization of temperature. This procedure is particularly advantageous because it does not introduce any significant unbalance into the rotor such as might occur with some other procedure for the secure attachment of these parts.

The substantially solid annular blank thus obtained is then machined. This is done in such a way that the through bore 16 of the blank is machined accurately to a size appropriate for the accommodation of the stator 52 with allowance for the air gap as well as for the accommodation of the outer rings 98 and 100, respectively, of the ball bearing 82 and 84, respectively. Subsequently the end faces of the gyro rotor are machined accurately in a machining procedure oriented by the through bore 16 previously machined. The machining of the rotor may be effected by turning, grinding and, if required, by honing of the through bore 16. Subsequently the rotor 10 is mounted on a mandrel, positioned between dead centers, and ground on a good circular grinding machine both at the two plane surfaces 18 and 20 and at its outer surface.

For the manufacturing of an asynchronous gyro squirrel cage, rods 50 and squirrel cage rings 34 and 36 are manufactured mechanically as individual parts of copper or silver, are assembled together with the laminated stack 30 made of sheet metal affected by temperature (Permenorm sheet metal) and are welded by means of electron beam welding. Welding of a squirrel cage rod to the squirrel cage rings can be effected perfectly with a welding seam length of 27 millimeters and a welding seam depth of 2.5 millimeters within only 22 seconds. Even if all squirrel cage rods are welded to the squirrel cage rings in this manner one immediately after the other, the laminated stack is heated only by a few degrees. Therefore it is possible to make a laminated stack from Permenorm sheet metal, which is affected by over-temperature. At the same time, it is possible to use materials such as silver or copper for the squirrel cage rods and squirrel cage rings, which materials are more favorable as far as the conductivity is concerned, and this is done in such a way that no undesirably high contact resistances between the squirrel cage rods and squirrel cage rings occur. In prior art methods, such resistances may ruin the favorable influence of the high conductivity of copper or silver.

The stator laminated stack 62 is shrink fitted or adhesively affixed on the axle 54 of the stator 52. For shrink (or heat) fitting the stator laminated stack is formed with a central opening smaller than the central portion of the axle. Thereafter the dimensions of the parts are thermally adjusted (as previously described) to enable them to be fitted together and to securely engage each other. The bearing seats of the axle are initially formed with a machining allowance. After assembly of the laminated stack on the axle, the ball bearing seats 70 and 72 on the axle 52 are machined with high precision. To this end the ball bearing seats 70 and 72 and the circumferential surface 116 of the laminated stack 62 preferably are machined between dead centers on a circular grinding machine.

After the stator 52 has been inserted into the through bore 16, the ball bearings 82 and 84 are put onto the ball bearing seats 70 and 72, respectively, and the cylindrical circumferential surfaces 102 and 104 of the outer rings 90 and 92, respectively, are set into the through bore 16 of the gyro rotor 10. Nuts 110 and 112 thereafter are screwed onto the axle 54 of the stator 52, thus preloading the ball bearings. To enable this preloading to be accomplished it should be noted that there are no abutments on the bearing seats to be contacted by the bearing inner rings 86, 88 and thus no limitation on the extent of preloading adjustment. A gyroscope so constructed and manufactured has an inherently small unbalance. The gyro rotor can be balanced in two planes by removing metal, as by means of drilling, at appropriate locations in circumferential grooves 120 and 122, respectively.

Preferably the case member 22, the end members 26 and 28 and the axle 54 of the stator 52 consist of one and the same material, for which purpose a material may be selected which has a negligible coefficient of expansion. Thereby the cooperating dimensions practically do not vary even with temperature variations. Due to its mode of attachment the motor drive member 14 is able to expand symmetrically to both sides with temperature variations, without causing any displacement of the center of gravity thereby. Remaining differences of expansion are effective symmetrically with respect to the center plane of the gyroscope and can be taken up within the elastic range due to the shape of the outer rings of the ball bearings.

We claim:

1. A method for manufacturing a gyroscope comprising jacket-shaped rotor means with an opening therethrough, said rotor means being a substantially solid annular part, a stator located inside the opening of the rotor means, an axle firmly attached to the stator and defining an axis of rotation with the stator having two sides in planes generaly normal to said axis, and prestressed ball bearing assemblies at both sides of the stator and mounted on said axle, each bearing assembly including an inner ring and an outer ring with balls therebetween, said rotor means having end faces in planes generally normal to said axis and including an annular jacket member and an annular motor drive member centrally within secured to the jacket member, said rotor means having an inner surface which at said end faces forms bearing surfaces cylindrical about said axis, said outer rings of said bearing assemblies including outer faces with cylindrical circumferential surfaces received directly in said bearing surfaces respectively and flanges abutting said end faces respectively, said rotor means between said end faces including three parts, namely, a central part and two end parts, said three parts being all within said jacket member and all defining a straight cylindrical through bore concentric with said axis and being said opening, said motor drive member forming said central part, said rotor means including annular end members forming said end parts respectively, said annular end members having inner walls defining said bearing surfaces and end faces in said planes of said rotor means, said end faces of said end members having annular grooves extending inwardly from said planes of said rotor means concentric to the axis of rotation and positioned at a distance from said opening such that said inner walls adjacent the end faces of the end members define resilient rim portions against which said outer rings are mounted as aforesaid, said method comprising the steps of:

forming said end members with an exterior diameter greater than the diameter of the bore of the jacket member, with a machining allowance at the interior thereof, and with a machining allowance at the faces thereof which will correspond to the end faces of the rotor;

forming at least part of the periphery of the motor member with an exterior diameter greater than that of the bore of the jacket member;

thermally adjusting the dimensions of the members so that said exterior diameters are smaller than the diameter of the jacket member bore, assembling said motor member and said end members in said jacket member, and equilibrating the temperatures of said members, whereby said jacket member securely engages said motor members and said end members to form a blank for said substantially solid annular part;

thereafter accurately machining said blank to form said opening of said rotor means;

thereafter machining said end faces on said blank while orienting said machining operation by use of the previously formed opening of said rotor means; and assembling said rotor means and bearings with the rotor means so formed.

* * * * *